US006285986B1

(12) United States Patent
Andrews

(10) Patent No.: US 6,285,986 B1
(45) Date of Patent: *Sep. 4, 2001

(54) METHOD OF AND APPARATUS FOR INTERACTIVE AUTOMATED REGISTRATION, NEGOTIATION AND MARKETING FOR COMBINING PRODUCTS AND SERVICES FROM ONE OR MORE VENDORS TOGETHER TO BE SOLD AS A UNIT

(75) Inventor: Christopher C. Andrews, Los Altos, CA (US)

(73) Assignee: Venturemakers LLC, Campbell, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/425,497

(22) Filed: Oct. 22, 1999

Related U.S. Application Data

(60) Provisional application No. 60/148,639, filed on Aug. 11, 1999.

(51) Int. Cl.[7] .................................................. G06F 17/60
(52) U.S. Cl. .............................................. 705/26; 705/27
(58) Field of Search ................................ 705/26, 27, 14

(56) References Cited

U.S. PATENT DOCUMENTS

| | | | |
|---|---|---|---|
| 5,039,848 | * | 8/1991 | Stoken ................................. 235/381 |
| 5,481,094 | * | 1/1996 | Suda ..................................... 235/383 |
| 5,694,551 | * | 12/1997 | Doyle et al. ............................ 705/26 |
| 5,742,931 | * | 4/1998 | Spiegelhoff et al. ..................... 705/8 |
| 5,930,768 | * | 7/1999 | Hooban ................................. 705/27 |
| 5,995,937 | * | 11/1999 | Debusk et al. ........................... 705/2 |
| 6,016,504 | * | 1/2000 | Arnold et al. ........................ 709/200 |
| 6,029,141 | * | 2/2000 | Bezos et al. ............................ 705/27 |
| 6,035,287 | * | 3/2000 | Stallaert et al. ........................ 705/37 |
| 6,076,069 | * | 6/2000 | Laor ..................................... 705/14 |

FOREIGN PATENT DOCUMENTS 9-128894A * 12/1998 (JP) .
WO 99/07121 * 2/1999 (WO) .

OTHER PUBLICATIONS

Joy K., "Secrets of Cross–Marketing," High–Tech Marketing, vol. 4, No. 4, pp. 40–41. Apr. 1997.*

Kohli, R., et al., "Coordinating Buyer–Seller Transactions across Multiple Products," Management Science, vol. 40, No. 9, pp. 1145–1150 (Abstract only), Sep. 1994.*

* cited by examiner

Primary Examiner—Vincent Millin
Assistant Examiner—Nicholas David Rosen
(74) Attorney, Agent, or Firm—Haverstock & Owens LLP

(57) ABSTRACT

A method of interactive, automated registration, negotiation and marketing for combining products and services from one or more vendors together to be sold as a unit allows vendors of products and services to post information about their products/services on a server, preferably accessible over the internet, for inclusion within bundles or collections of products and/or services. Bundle vendors then generate bundles of products/services by viewing and selecting available products/services from the posted available products/services. Members accessing the bundle system are able to view, select and purchase bundles generated and posted by the bundle vendors. The members and vendors preferably access the bundle server over the internet through the public switched telephone network. When a bundle is purchased by a member, the products/services within the bundle are then shipped or provided to the member either as a unit or separately from the participant vendors of the products/services included within the bundle. A bundle tracking system allows both members and vendors to obtain status information regarding currently existing bundles. Using the bundle system of the present invention, vendors can post products/services for inclusion in bundles advertised and sold to members accessing the bundle system.

35 Claims, 11 Drawing Sheets

METHOD OF AND APPARATUS FOR INTERACTIVE AUTOMATED REGISTRATION, NEGOTIATION AND MARKETING FOR COMBINING PRODUCTS AND SERVICES FROM ONE OR MORE VENDORS TOGETHER TO BE SOLD AS A UNIT

RELATED APPLICATIONS

This application claims priority under 35 U.S.C. § 119(e) of the co-pending U.S. provisional application Serial No. 60/148,639 filed on Aug. 11, 1999 and entitled "MULTI-PERSON AUTOMATED REGISTRY, NEGOTIATING AND MARKETING SYSTEM FOR PRODUCTS WHICH ARE PACKAGED TOGETHER ("BUNDLES")." The provisional application Serial No. 60/148,639 filed on Aug. 11, 1999 and entitled "MULTI-PERSON AUTOMATED REGISTRY, NEGOTIATING AND MARKETING SYSTEM FOR PRODUCTS WHICH ARE PACKAGED TOGETHER ("BUNDLES") is also hereby incorporated by reference.

FIELD OF THE INVENTION

The present invention relates to the field of systems for selling and promoting products and services. More particularly, the present invention relates to the field of systems for automatically selling and promoting groups of products and services.

BACKGROUND OF THE INVENTION

The World Wide Web (also known as and hereinafter referred to as the "Internet") is a rapidly expanding network of computers which provide users with numerous services and a wealth of information. The internet is primarily a visually based system, allowing a user to graphically interact with an image or series of images on a display screen.

The internet was originally created as a non-commercial venue to provide communication links between government institutions as well as institutions of higher learning. Today, the internet has evolved to become a universal network of computers which include private industry as well as government institutions. The internet has become widely accessible to many people from computers located in many different places including homes and offices. Users are able to locate updated information regarding the weather, stock prices, news and many other topics. Further, users are able to locate a wide variety of information regarding products and services. Users are also able to buy products and services from retail-oriented internet sites which are then shipped or provided to them after their order is placed. On auction-oriented internet sites users are able to bid against other users for products or services with the user making the highest bid within the specified time period receiving the particular product or service. Users are also able to communicate with other users over the internet through e-mail, bulletin boards, message lists and chat sites.

The internet offers many advantages over other media. The internet seamlessly links together and provides to users information stored on geographically distant servers. Similarly, the information on a server can be remotely updated from any geographic point from which access to the internet can be obtained.

When a user accesses information on a server over the internet, the user interfaces with the server through a website. Many websites offer hyperlinks to other websites, making the internet user friendly and allowing users to efficiently jump between websites and webpages. When accessing a website with a hyperlink to another website, by selecting the hyperlink, the user is enabled to link directly from the current website to the linked website without entering an address of the linked website. In use, a hyperlink is a visually discernible notation. The user activates or selects the hyperlink by "clicking" on the hyperlink notation or icon. This selection of the hyperlink is also referred to as a point and click operation. The user's computer is programmed to automatically access the website identified by the hyperlink as a result of the user's point and click operation.

When accessing an internet site, a user instructs a computer system, settop box or other internet access device to dial up the server of the user's internet service provider. The internet access device then controls the operation of a modem to establish the connection with the internet service provider over the public switched telephone network. Once a connection has been made between the modem and the internet service provider, the user must then log on to the service, usually by entering a username and a password. When the user is logged on to the service, the user can then access services and information provided by the service provider and also information available through web pages at other addresses on the internet. When accessing information available over the internet, the user connects through their service provider to other servers which are providing information. This information is usually provided at internet sites and web pages. Each internet site and web page has a particular address through which it can be accessed. By entering this address, the user is instructing their internet service provider to connect them to that address. As described above, the user also instructs their internet service provider to connect them to a specific address by selecting a hyperlink through a point and click operation.

When accessing retail-oriented internet sites, a user is typically able to search for and obtain information about products and services offered by the site. If the user decides to purchase a product from the site, the user selects the hyperlink corresponding to the product. Typically, the user then enters payment and shipping information notifying the internet site how the user is going to pay for the product and to where the user would like the product shipped. On auction-related internet sites, if the user has the highest bid at the end of the specified time period, then the user also enters the payment and shipping information.

For manufacturers and vendors of products and services the above-described models for retail-oriented and auction-related internet sites are currently the most viable options for selling their product or service over the internet. Typically, their product or service is advertised, sold and shipped individually. There is currently no system for automatically grouping products and services from multiple vendors into a group or bundle which is then advertised and sold as a unit.

SUMMARY OF THE INVENTION

A method of interactive, automated registration, negotiation and marketing for combining products and services from one or more vendors together to be sold as a unit allows vendors of products and services to post information about their products/services on a server, preferably accessible over the internet, for inclusion within bundles or collections of products and/or services. Bundle vendors then generate bundles of products/services by viewing and selecting available products/services from the posted available products/ services. Members accessing the bundle system are able to view, select and purchase bundles generated and posted by the bundle vendors. The members and vendors preferably access the bundle server over the internet through the public switched telephone network. When a bundle is purchased by a member, the products/services within the bundle are then shipped or provided to the member either as a unit or separately from the participant vendors of the products/ services included within the bundle. A bundle tracking system allows both members and vendors to obtain status information regarding currently existing bundles. Using the bundle system of the present invention, vendors can post products/services for inclusion in bundles advertised and sold to members accessing the bundle system.

In one aspect of the present invention, a method of generating a collection of items to be advertised and sold as a bundle includes the steps of posting available items for inclusion within the bundle for review by vendors, selecting one or more items to be included within the bundle and posting the bundle as available for purchase. The method further includes the step of accepting and processing orders of the bundle. Preferably, the items include selective ones of products, goods and services. The step of posting available items is performed by a server on which information about the available items is stored. The method further includes the step of establishing an internet connection with the server to view and select the available items for inclusion within the bundle. The step of posting the bundle is preferably performed by a server on which a bundle profile is stored. The method further includes the step of generating a bundle profile including information on the items included within the bundle. The method further includes the step of establishing an internet connection with the server to view the bundle profile of the bundle. The internet connection is preferably established with a computer system at a remote location from the server. The method further includes the step of registering the vendors as a selective one or more of a participant vendor having items for inclusion within the bundle and a bundle vendor taking responsibility for generating a bundle. The method further includes the step of negotiating terms of the bundle between the bundle vendor and the participant vendors. The method further includes the step of obtaining feedback on the bundle from a selective group of the users.

In another aspect of the present invention, a bundle system for posting items to be included within a bundle and generating a collection of items to be advertised and sold within a bundle includes means for posting available items for inclusion within the bundle for review by vendors, means for generating a bundle coupled to the means for posting for selecting one or more available items to be included within the bundle and means for posting the bundle coupled to the means for generating for posting the bundle as available for purchase. The means for posting the bundle further accepts and processes orders for the bundle. The means for posting available items is included within a server on which information about the available items is stored. The means for posting the bundle is also included within the server on which a bundle profile is stored. A connection is established with a computer system and the server to view and select the available items for inclusion within the bundle, to view the bundle profile of the bundle and to place an order to purchase the bundle. The connection is preferably established between the computer system and the server over the internet. The bundle profile includes information on the items within the bundle. The items preferably include selective ones of products, goods and services.

In yet another aspect of the present invention, a bundle system to post items to be included within a bundle and generating a collection of items to be advertised and sold within a bundle includes an interface circuit configured to establish a connection with a remote computer system and a bundle server coupled to the interface circuit to post available items for inclusion within the bundle for review by vendors, to generate a bundle by selecting one or more available items to be included within the bundle and to post the bundle as available to purchase. The bundle server further accepts and processes orders of the bundle. The connection is established with the remote computer system and the interface circuit over the internet to allow vendors to view and select the available items for inclusion within the bundle and to allow users to view and purchase the bundle. Preferably, only users registered with the bundle server as a member are allowed to view and purchase bundles. The items preferably include selective ones of products, goods and services. The vendors are preferably registered with the bundle server as a selective one or more of a participant vendor having items for inclusion within the bundle and a bundle vendor taking responsibility for generating a bundle.

In still yet another aspect of the present invention, a network of devices for generating a collection of items to be advertised and sold as a unit includes one or more computer systems configured to communicate with other systems and a bundle server configured to couple to the one or more computer systems to post available items for inclusion within a bundle for review by vendors, to generate a bundle by selecting one or more available items to be included within the bundle and to post the bundle as available to purchase. The bundle server further accepts and processes orders of the bundle. The one or more computer systems and the bundle server are preferably coupled together over the internet to allow vendors to view and select the available items for inclusion within the bundle and to allow users to view and purchase the bundle. The vendors are preferably registered with the bundle server as a selective one or more of a participant vendor having items for inclusion within the bundle and a bundle vendor taking responsibility for generating a bundle. Preferably, only users registered with the bundle server as a member are allowed to view and purchase bundles. Preferably, the items include selective ones of products, goods and services.

DETAILED DESCRIPTION OF THE PREFERRED EMBODIMENT

Using the bundling system of the present invention, a vendor posts an available product/service for inclusion in bundles or collections of products and/or services to a bundle server using a product entry system. To post a product/service, a vendor enters information about the product into the bundle server through the vendor access system. The product/service information is then stored within the bundle server and displayed with other available products/services for vendors to view. To generate a bundle, a bundle vendor then views the available products/services on the bundle server and selects particular products/services to include within the bundle. Once a bundle is generated, a bundle profile is created for the bundle which includes information about the bundle and the products/services included within the bundle. When a bundle and bundle profile are generated, information about the bundle and the bundle profile are stored within the bundle server and displayed with other available bundles to be viewed by members accessing the bundle server through a member access system. Members access the bundle server through the member access system to view, select and purchase bundles from the available bundles posted on the bundle server. When a bundle is purchased by a member, the products/services within the bundle are then shipped or provided to the member either as a unit or separately from the participant vendors of the products/services included within the bundle. The members and vendors preferably access the bundle server over the internet through the public switched telephone network. The bundling system also includes a bundle tracking system which preferably allows both members and vendors to obtain status information regarding currently existing bundles. Using the bundling system of the present invention, vendors can post products/services for inclusion in bundles advertised and sold to members of the bundle system. Also, using the bundling system of the present invention, bundle vendors can generate bundles of products/services posted on the bundle server which are then advertised and sold to members of the bundling system.

The terms good, product and service are used interchangeably within this document to describe items included within bundles. Any item, including a good, product or service, that can be bought, sold, traded or given away, can be posted to and included within a bundle advertised on the bundle system of the present invention. It should be understood that when the terms good, product or service are used, these terms are used to generally refer to both available items and available services provided by vendors. Also, while the term product/service is used herein to generally refer to items available for and included within bundles, a vendor can also post and include a coupon, rebate and/or other incentive, for inclusion within bundles.

Figure 1:
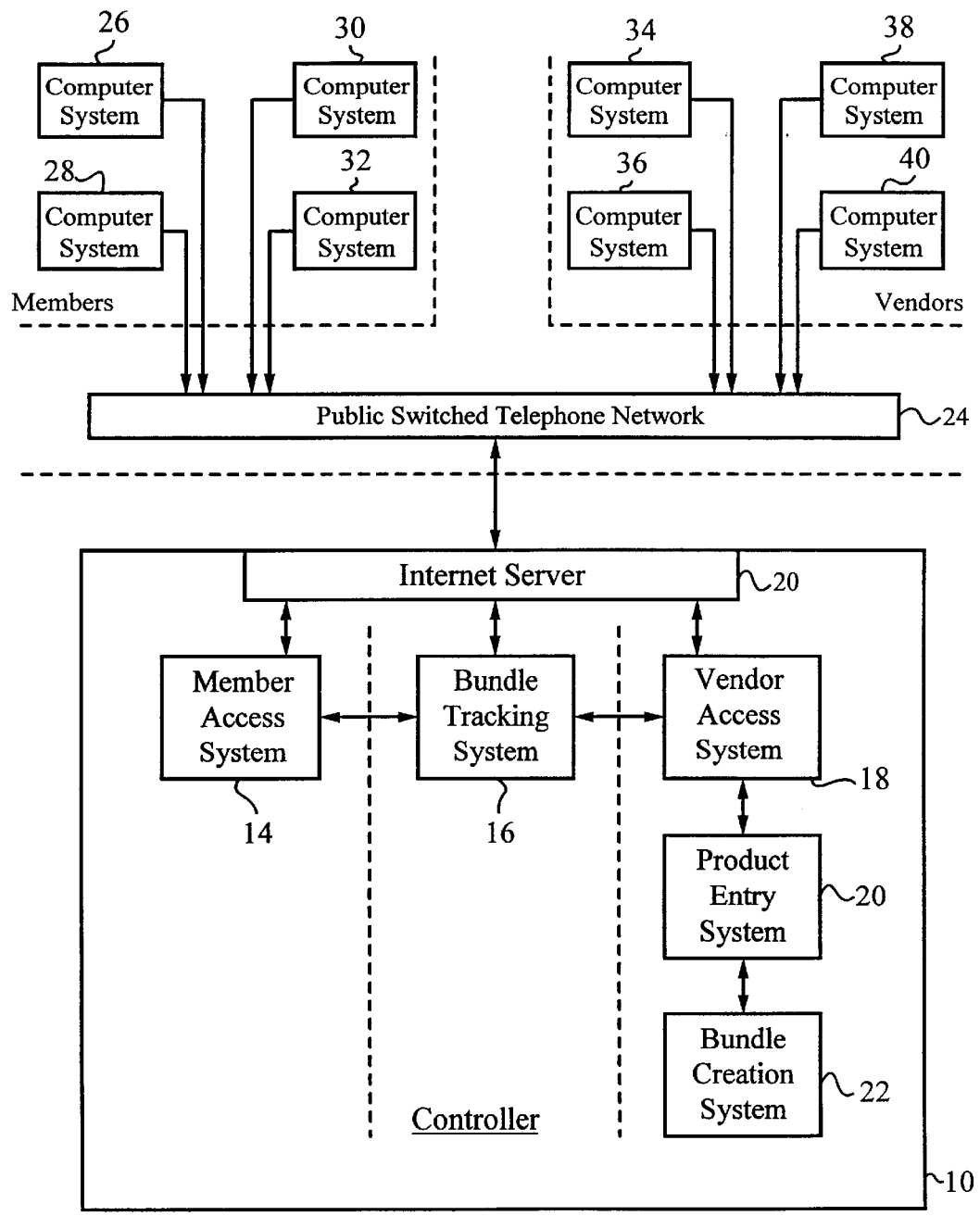
FIG. 1 illustrates a block diagram schematic of a bundling system according to the preferred embodiment of the present invention.

A block diagram of a bundling system according to the preferred embodiment of the present invention is illustrated in FIG. 1. A bundling controller 10 includes an internet server 12, a member access system 14, a vendor access system 18 and a bundle tracking system 16. The member access system 14 is coupled to the internet server 12 and to the bundle tracking system 16 to control communications between the bundling controller 10 and members accessing the bundling system. As used herein, members are users of the bundling system which access the bundling controller 10 to view, purchase and review bundles of products/services preferably over the internet. As used herein, the term member includes one or more of an individual, group of individuals, association, corporation or any other person or entity accessing the bundle system to review and purchase bundles. Preferably, a member is registered with the bundle system of the present invention. Alternatively, a member is any user or group of users accessing the bundle system of the present invention.

The vendor access system 18 is coupled to the internet server 12 and to the bundle tracking system 16 to control communications between the bundling controller 10 and product/service vendors. As used herein, vendors are users of the bundling system which access the bundling controller 10 to post products/services for inclusion in bundles and to generate bundles which include their and/or others' products/services for sale on the bundling system of the present invention. As used herein, the term vendor includes one or more of individual or groups of manufacturers, resellers, retailers, owners, providers and any other person or entity accessing the bundle system to post products/services for inclusion in bundles and to generate bundles which include their own and/or others' products/services for sale on the bundling system of the present invention. A participant vendor is a vendor whose product/service is included within a bundle. A bundle vendor is a vendor responsible for generating a bundle. The vendor access system 18 includes a product entry system 20 and a bundle creation system 22. The bundle tracking system 16 is accessed by both members and vendors to check the status of a particular bundle.

The bundling controller 10 is coupled to the public switched telephone network 24 to allow communications between both the internet server 12 and the members' computer systems 26–32 and the vendors' computer systems 34–40. Using the computer systems 26–32, members can establish a connection with the member access system 14 to view, purchase and review product/service bundles. Preferably, this connection is established between the members' computer systems 26–32 and the bundling controller 10 over the internet through the public switched telephone network 24. Alternatively, this connection is established by any appropriate connection including a direct connection over the public switched telephone network 24. Using the computer systems 34–40, vendors establish a connection with the vendor access system 18 to post products/services for inclusion in bundles and to generate bundles with theirs and/or others products. Preferably, this connection is established between the vendors' computer systems 34–40 and the bundling controller 10 over the internet through the public switched telephone network 24. Alternatively, this connection is established by any appropriate connection including a direct connection over the public switched telephone network 24.

Figure 2:
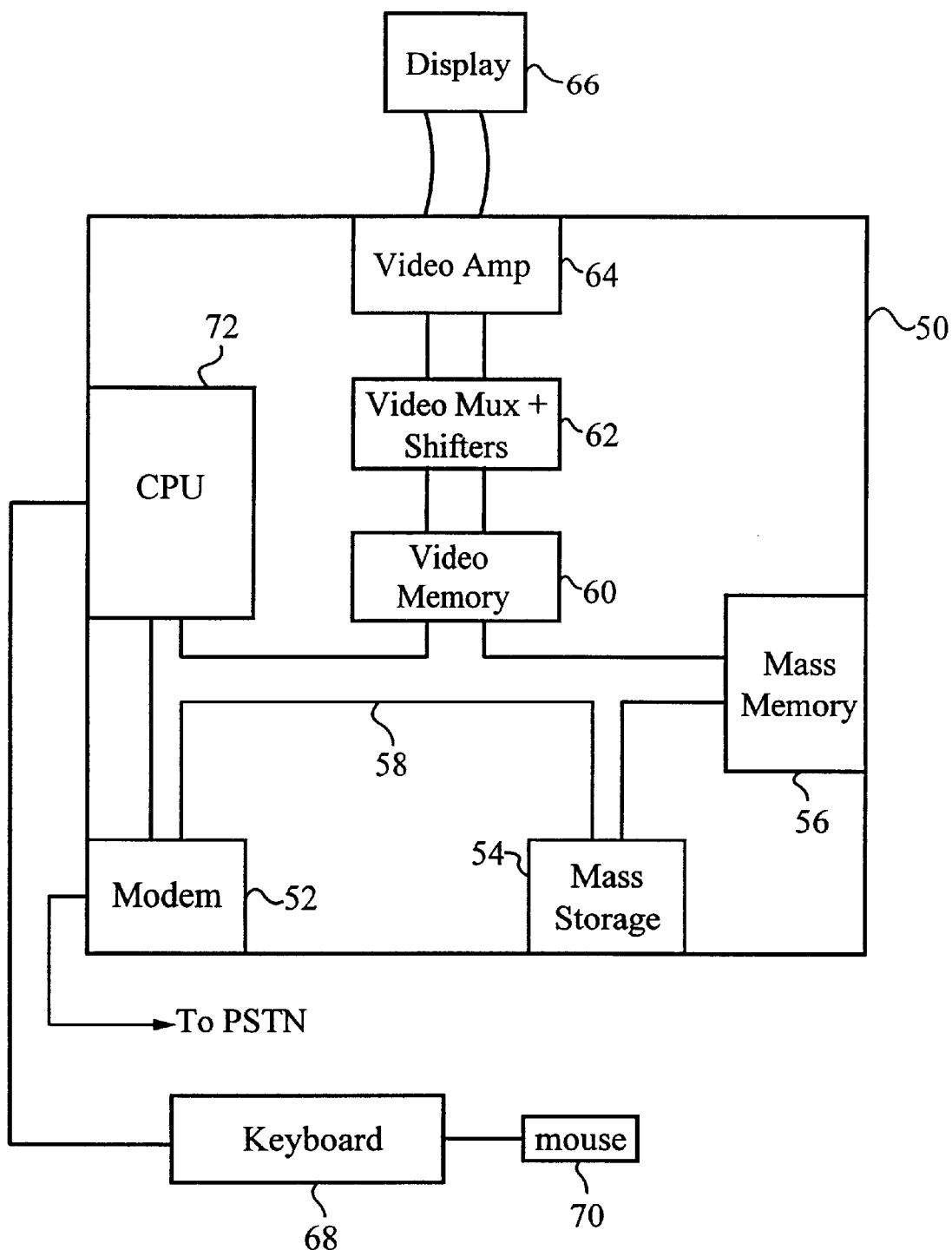
FIG. 2 illustrates a block diagram of the internal components of the computer systems used to access the bundling controller of the preferred embodiment of the present invention.

A block diagram of the internal components of the computer systems 26–40 used by members and vendors to access the bundling controller 10 of the present invention is illustrated in FIG. 2. While the bundling controller 10 can be accessed from any appropriately configured computer system or internet access device, an exemplary computer system 50 for accessing the bundling controller 10 is illustrated in FIG. 2. The exemplary computer system 50 includes a CPU 72, a main memory 56, a video memory 60, a mass storage device 54 and a modem 52, all coupled together by a conventional bidirectional system bus 58. The modem 52 is preferably coupled to the public switched telephone network 24 for sending and receiving communications. The mass storage device 54 may include both fixed and removable media using any one or more of magnetic, optical or magneto-optical storage technology or any other available mass storage technology. The system bus 58 contains an address bus for addressing any portion of the memory 54, 56 and 60. The system bus 58 also includes a data bus for transferring data between and among the CPU 72, the main memory 56, the video memory 60, the mass storage device 54 and the modem 52.

The computer system 50 is also coupled to a number of peripheral input and output devices including the keyboard 68, the mouse 70 and the associated display 66. The keyboard 68 is coupled to the CPU 72 for allowing a user to input data and control commands into the computer system 50. A conventional mouse 70 is coupled to the keyboard 68 or computer system 50, directly, for manipulating graphic images on the display 66 as a cursor control device in a conventional manner. The display 66 displays video and graphical images generated by the computer system 50.

A port of the video memory 60 is coupled to a video multiplex and shifter circuit 62, which in turn is coupled to a video amplifier 64. The video amplifier 64 drives the display 66, when it is being used. The video multiplex and shifter circuitry 62 and the video amplifier 64 convert pixel data stored in the video memory 60 to raster signals suitable for use by the display 66.

Figure 3:
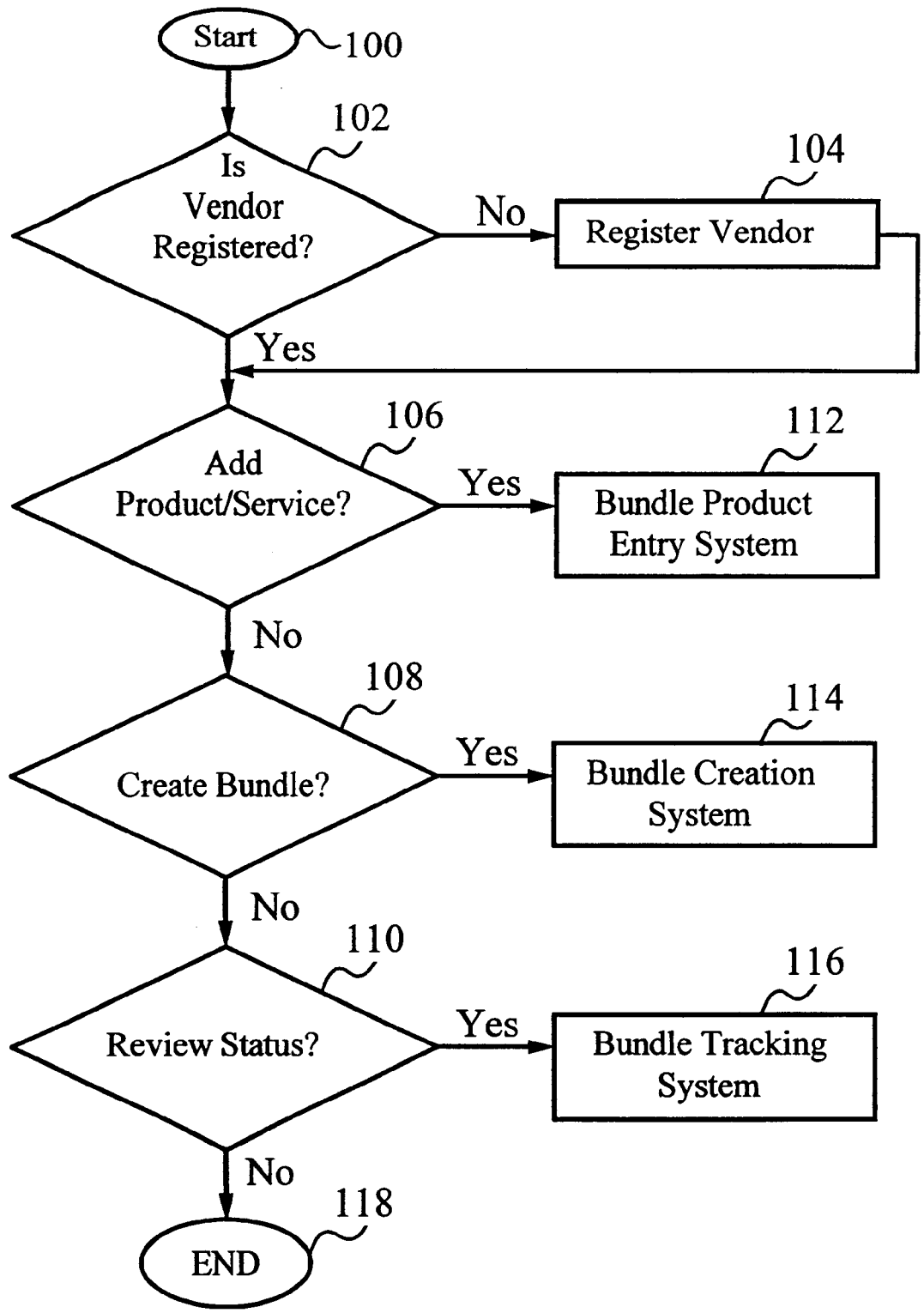
FIG. 3 illustrates a flowchart showing the process used when a vendor accesses the vendor access system of the present invention.

A flowchart illustrating the process used when a vendor accesses the vendor access system 18 is illustrated in FIG. 3. It should be understood that a vendor as used herein, includes not only conventional vendors of products such as a manufacturer, distributor or retailer, but also includes any person or entity owning a product or providing a service that they would like to post on the bundle system of the present invention, including members of the bundle system. A vendor can post a product/service on the bundle system for inclusion in a bundle, even if the product/service is one of a kind or of limited quantity. The process of FIG. 3 starts at the step 100. At the step 102 it is determined if the vendor currently accessing the vendor access system 18 is registered with the vendor access system 18. If the vendor is not yet registered with the vendor access system 18, then the vendor is registered at the step 104, by entering registration information such as name, address and types of products/services that the vendor carries or provides. Once the vendor is registered with the vendor access system 18, then it is determined at the step 106 if the vendor would like to post products or services to the bundling controller 10 for other vendors and sellers to include within bundles. If the vendor does want to add products or services for inclusion within bundles, then at the step 112, the process jumps to the product entry system process, which will be described below. If the vendor does not want to add products or services for inclusion within bundles, then it is determined at the step 108 if the vendor would like to generate a bundle of products/services posted for inclusion within bundles. If the vendor does want to create a bundle of posted products/services, then at the step 114, the process jumps to the bundle creation system process, which will be described below.

If the vendor does not want to generate a bundle of posted products/services, then it is determined at the step 110 if the vendor would like to review the status of an already created bundle of products/services. If the vendor does want to review the status of an already created bundle of products/services, then at the step 116, the process jumps to the bundle tracking system process, which will be described below. If the vendor does not want to review the status of an already created bundle of products/services, then the vendor access system process ends at the step 118.

Figure 4A:
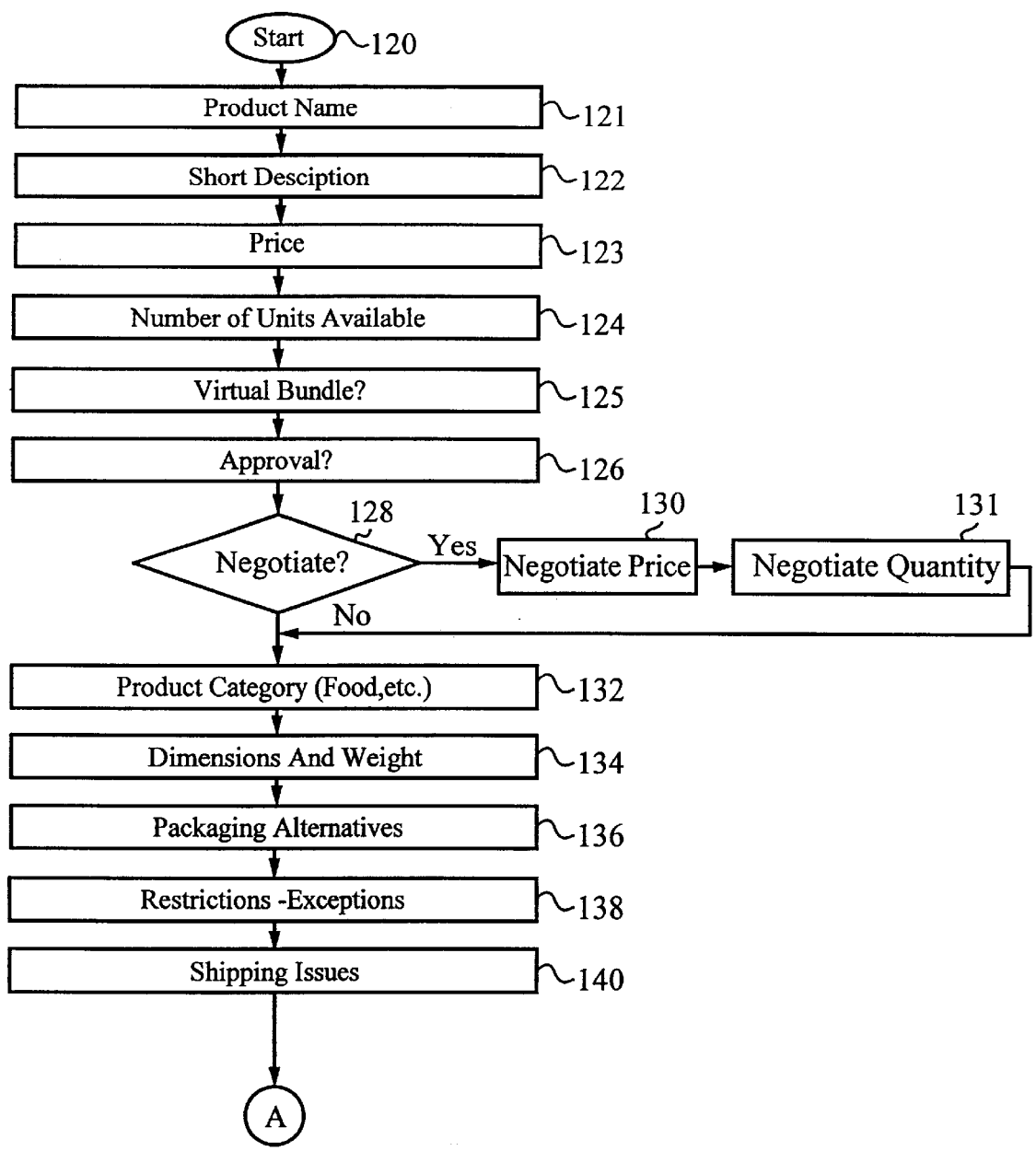
FIG. 4 illustrates a flowchart showing the bundle product entry process used when a vendor posts products or services for inclusion within bundles generated using the bundle system of the present invention.
Figure 4B:
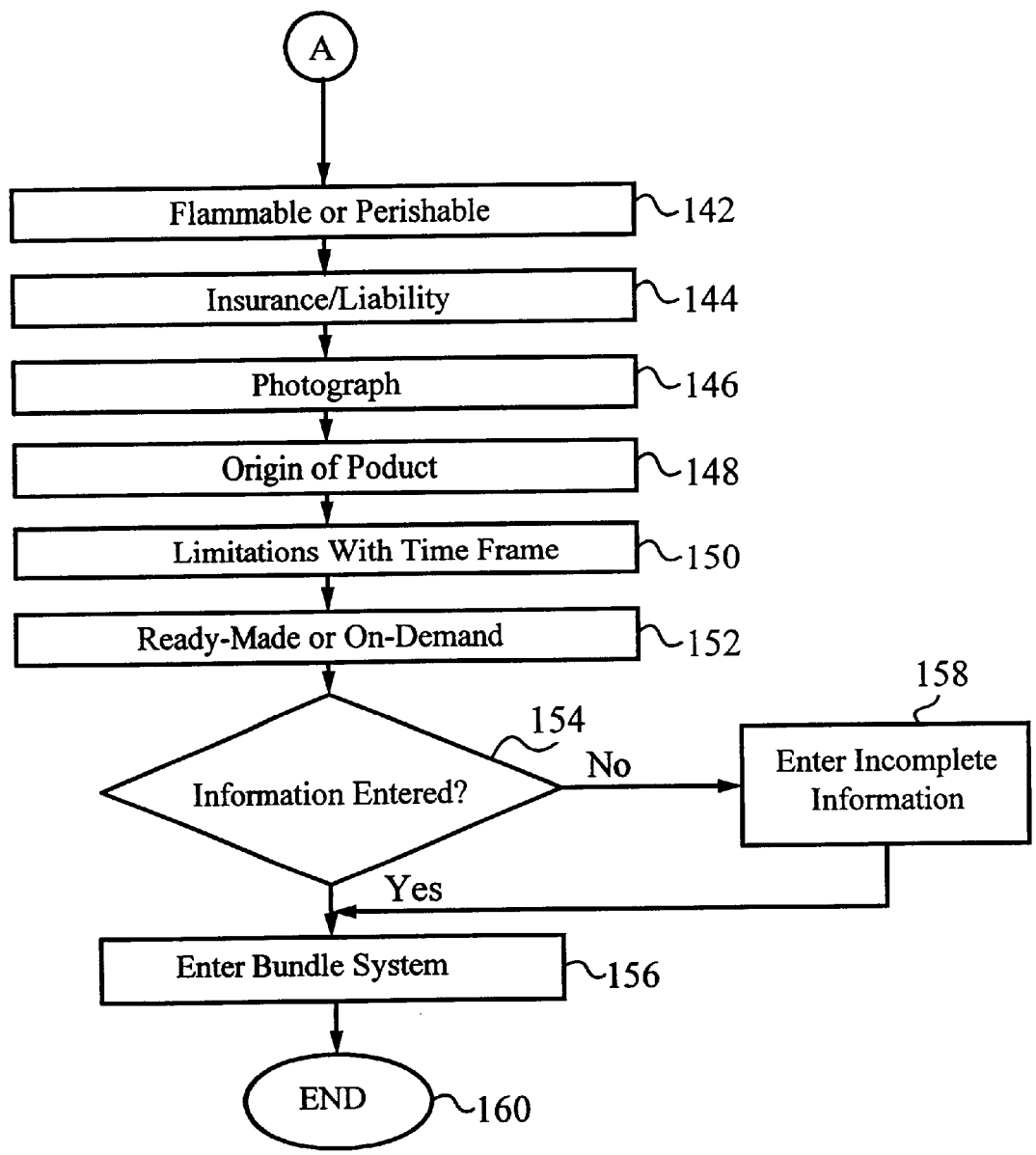

A flowchart illustrating the bundle product entry process used when a vendor wants to add products or services for inclusion within bundles is illustrated in FIG. 4. The product entry process starts at the step 120. At the step 121, the vendor is prompted to enter the name of the product/service. At the step 122, the vendor is prompted to enter a short description of the product/service. At the step 123, the vendor is prompted to enter the suggested retail price for the product/service and the price at which the vendor is willing to sell the product/service for inclusion in a bundle. If the vendor of the product/service is willing to have the product/service included in a bundle which will be auctioned, then the vendor can also specify a minimum auction price for the product/service. At the step 124, the vendor is prompted to enter the number of units available. The number of units available can be any number including one. At the step 125, the vendor is prompted to determine if the product/service is available for inclusion in a virtual bundle. A virtual bundle is a bundle in which each participant vendor agrees to ship or provide their product/service directly to the purchasing member. In such a virtual bundle, the products/services are not bundled and shipped together, but are rather sold as a bundle and then shipped or provided separately from each participant vendor, directly to the purchasing members. Accordingly, by stating that the product/service is available for inclusion in a virtual bundle, the participant vendor is committing to ship or provide the product/service directly to the purchasing member.

At the step 126, it is determined if the vendor wants to approve any bundles in which their product/service is included. If the vendor does not want to approve any bundles in which their product/service is included, then when their product is chosen for inclusion within a bundle, the bundle system automatically indicates the vendor's approval. At the step 128 it is determined if the vendor is willing to negotiate terms if and when this product/service is reviewed and chosen for inclusion within a bundle.

If it is determined at the step 128, that the vendor entering the information about this product/service into the product entry system is willing to negotiate terms when this product is included within a bundle, then it is determined at the step 130, if the vendor is willing to negotiate on price. At the step 131, the vendor is prompted to determine whether or not the vendor is willing to negotiate on quantity of the product/service available for a bundle. If it is determined, at the step 128, that the vendor is not willing to negotiate terms when this product is included within a bundle or after it is determined, at the step 131, whether or not the vendor is willing to negotiate on quantity, then at the step 132, the vendor is prompted to enter the category for the product/service, such as food, consumer electronic, computer, sporting goods, book and toy. At the step 134, the vendor is prompted to enter the dimensions and weight of the product. At the step 136, the vendor is prompted to enter the packaging alternatives for the product. At the step 138, the vendor is prompted to enter any restrictions and/or exceptions associated with the product/service. At the step 140, the vendor is prompted to enter any issues that a potential bundle vendor should know about shipping the product. At the step 142, the vendor is prompted to enter whether or not the product is flammable or perishable. If the vendor is listing this product/service only for inclusion in virtual bundles, then the shipping information entered in the steps 132–142 is not necessary.

At the step 144, the vendor is prompted to enter information about insurance and liability associated with the product/service. At the step 146, the vendor is prompted to enter a photograph showing the product or demonstration of the service. At the step 148, the vendor is prompted to enter information regarding the origin of the product. At the step 150, the vendor is prompted to enter information regarding any time restrictions associated with the product. At the step 152, the vendor is prompted to enter information regarding inventory issues, such as whether the product is available immediately or will be made on demand.

At the step 154, after it is determined whether the product is available immediately or will be made on demand at the step 152, it is then determined if all of the necessary information regarding the product/service has been entered. As will be apparent to those skilled in the art, not all of the information requested in the steps 132–152 is necessary to enter for every product/service posted on the bundle system. As an example, a coupon for a service has no relevant dimensions and weight. If it is determined that all of the information regarding the product/service has been entered, then at the step 156, the product/service and associated descriptive information is entered into the bundle system for review by vendors creating bundles. If it is determined at the step 154, that all of the necessary information regarding the product/service has not been entered, then at the step 158, the vendor is prompted to re-enter the incomplete information. Once the incomplete information is entered, then at the step 156, the product/service and associated descriptive information is entered into the bundle system for review by vendors creating bundles. The process is then ended at the step 160.

Figure 5A:
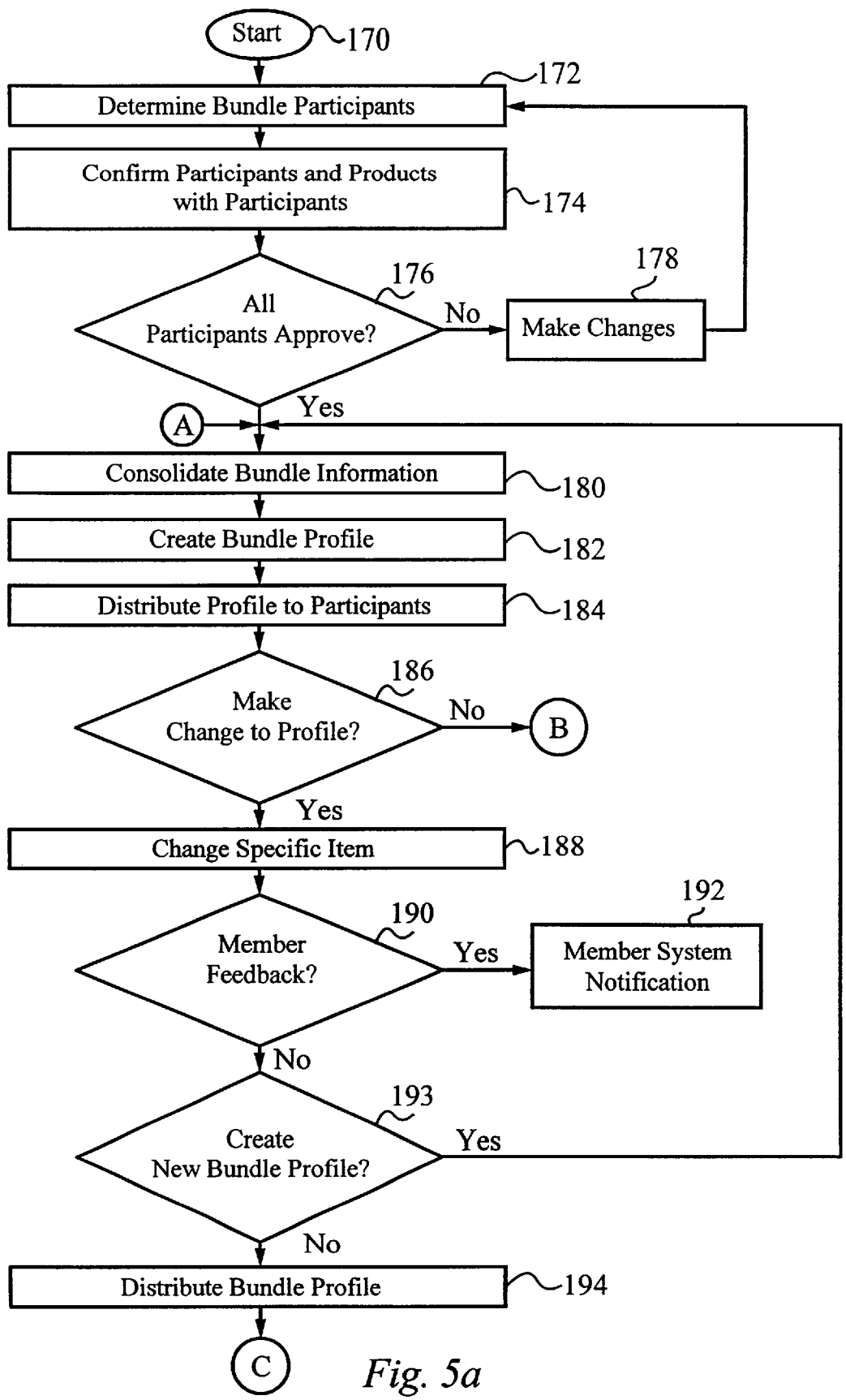
FIGS. 5A and 5B illustrate a flowchart showing the bundle creation system process used when a bundle vendor generates a bundle or collection of products or services within the bundle system of the present invention.
Figure 5B:
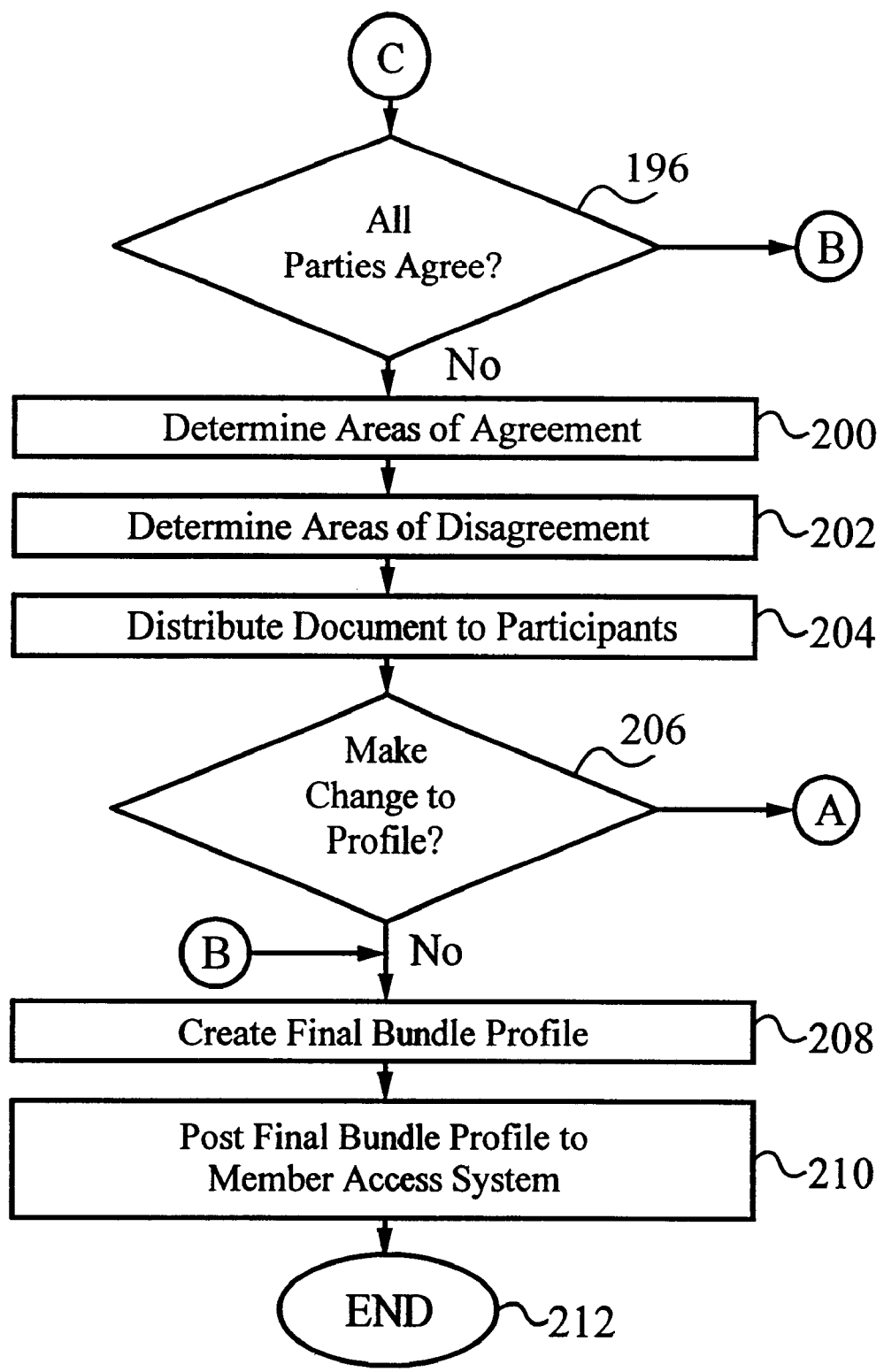

A flowchart illustrating the bundle creation system process used when a bundle vendor wants to create a bundle or collection of products or services for sale within the bundle system of the present invention is illustrated in FIGS. 5A and 5B. The bundle creation system process begins at the step 170. When a bundle is created, a vendor registered with the vendor access system 18 preferably takes the lead and reviews the available products/services which have been entered into the bundle system and the bundle negotiation system to generate a bundle or collection of products/services that will be attractive to consumers. A bundle can be any number of products/services, coupons and/or other incentives. A bundle can even include only a single product/service, coupon and/or other incentive.

At the step 172, this bundle vendor is prompted to enter the products/services to be included within this bundle. At the step 174, the availability of the chosen products/services is confirmed with the participant vendors who entered those products/services into the bundle and bundle negotiation systems. At the step 176, it is determined if all of the participant vendors approved of the proposed bundle and confirmed the availability of their respective products/services. For vendors who entered a product included within the bundle and also declined approval of bundles in which their product/service is included, this approval is automatically entered by the system. If it is determined that any of the participant vendors did not approve of the bundle or confirm the availability of their respective products/services, then the bundle vendor is notified at the step 178, that changes to the proposed bundle must be made. The process then jumps back to the step 172 to prompt the bundle vendor to enter the products/services to be included within the bundle.

If it is determined at the step 176 that all of the participant vendors did approve of the bundle and confirmed the availability of their respective products/services, then the information for the products/services within this bundle is consolidated at the step 180. At the step 182, a bundle profile is generated for this bundle. For a virtual bundle, this profile includes information about each of the products/services included in the bundle and that each participant vendor is responsible for shipping or providing their respective products/services directly to the purchasing member. For non-virtual bundles, this profile includes information about each of the products/services included in the bundle, packaging and shipping issues, including size and number of containers and cost of shipping. The bundle profile is then distributed to the participant vendors at the step 184. At the step 186, it is determined if any of the participant vendors or the bundle vendor had any changes to be made to the bundle profile. If it is determined that none of the participant vendors nor the bundle vendor had any changes to make to the bundle profile, then a final bundle profile is generated at the step 208. After the final bundle profile is generated at the step 208, the final bundle profile is posted to the member access system 14 to be viewed and purchased by members, at the step 210. The process then ends at the step 212.

Figure 7:
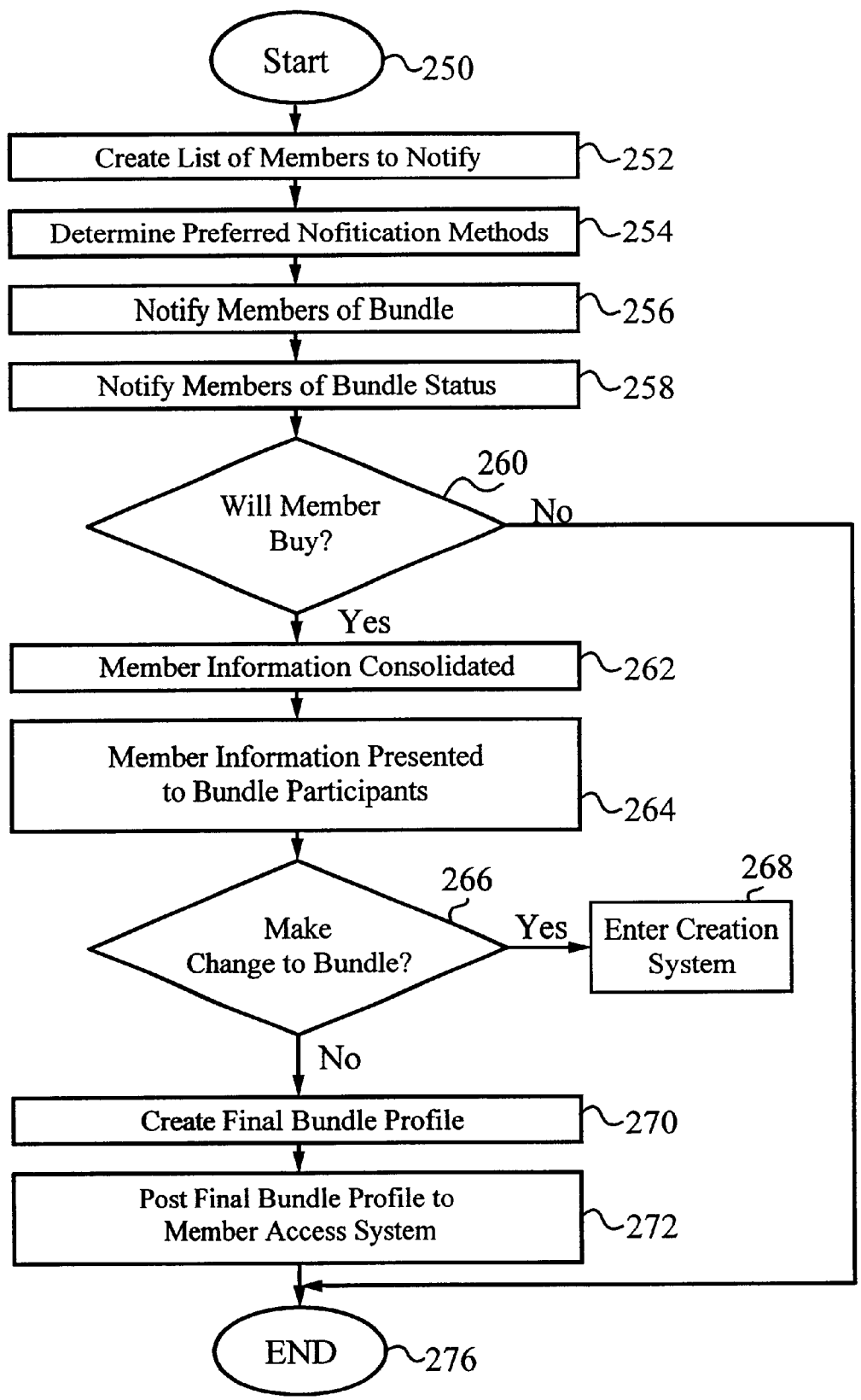
FIG. 7 illustrates a flowchart showing the member notification system process of the present invention.

If it is determined, at the step 186, that one or more of the participant vendors or the bundle vendor had changes to make to the bundle profile, then the specific item is changed within the bundle profile at the step 188. At the step 190, it is then determined if member feedback on the bundle profile is to be obtained. If member feedback on the bundle profile is to be obtained, then the bundle profile is transferred to the member notification system process at the step 192. The member notification system process is illustrated in FIG. 7 and will be described below. If it is determined at the step 190 that member feedback on the bundle profile is not to be obtained, then it is determined at the step 193 if a new bundle profile is to be generated. If a new bundle profile is to be generated, then the process jumps back to the step 180 to consolidate the bundle information and generate the new bundle profile. If it is determined at the step 193 that a new bundle profile does not need to be generated, the bundle profile is distributed to the participant vendors at the step 194.

At the step 196, it is then determined if all of the participant vendors and the bundle vendor now agree with the bundle profile. If it is determined that all of the participant vendors and the bundle vendor approve of the bundle profile, then a final bundle profile is generated at the step 208. After the final bundle profile is generated at the step 208, the final bundle profile is posted to the member access system 14 to be viewed and purchased by members, at the step 210. The process then ends at the step 212.

If it is determined, at the step 196, that all of the participant vendors and the bundle vendor did not approve of the bundle profile, then the areas of agreement are determined at the step 200 and the areas of disagreement are determined at the step 202. At the step 204, these areas of agreement and disagreement are then sent to the participant vendors and the bundle vendor. At the step 206, it is then determined if any changes need to be made to the bundle profile. If changes are to be made to the bundle profile, then the process jumps back to the step 180 to consolidate the bundle information and generate the new bundle profile. If it is determined at the step 206 that no changes are to be made to the bundle profile, then a final bundle profile is generated at the step 208. After the final bundle profile is generated at the step 208, the final bundle profile is posted to the member access system 14 to be viewed and purchased by members, at the step 210. The process then ends at the step 212.

Figure 6:
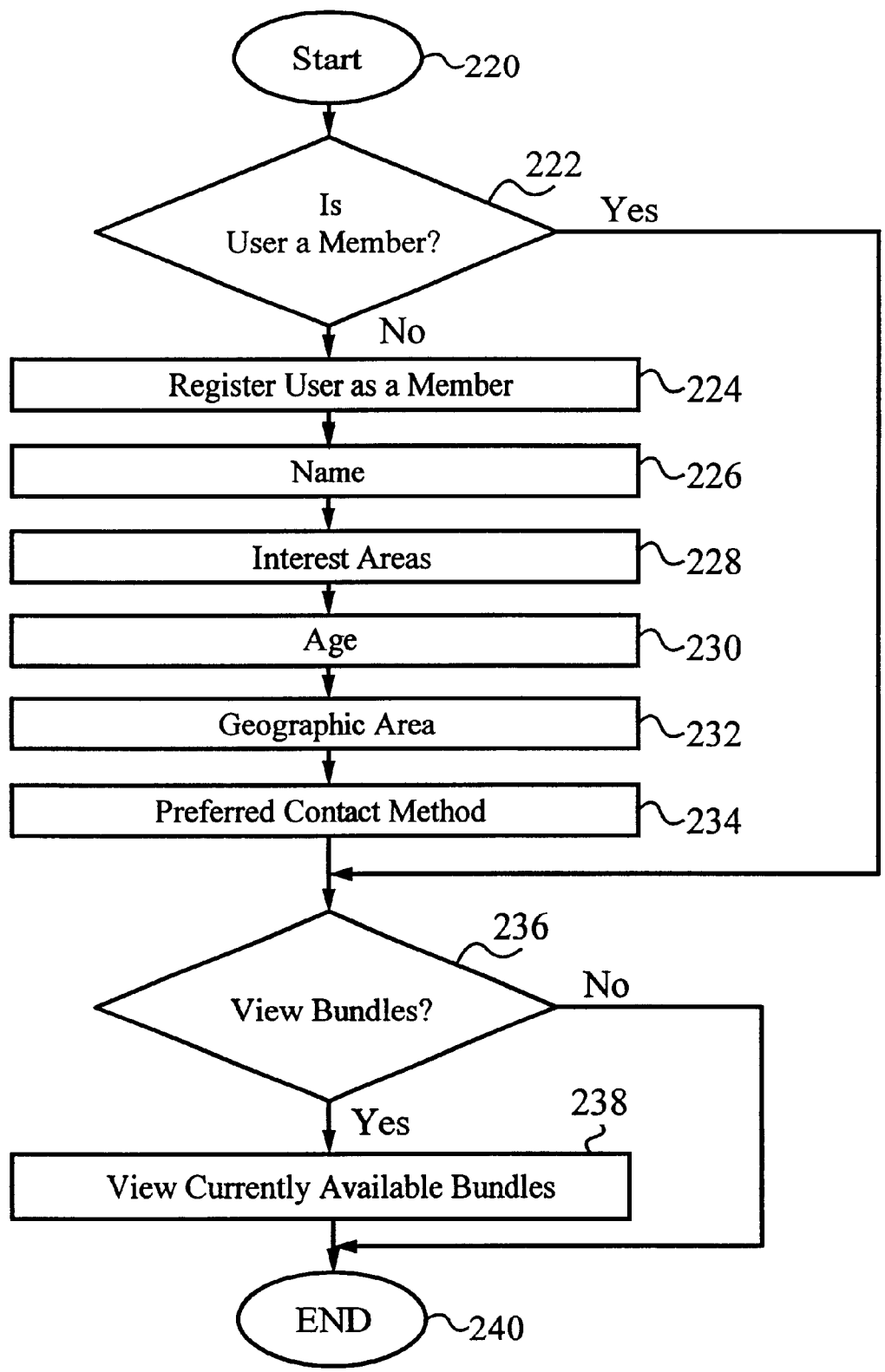
FIG. 6 illustrates a flowchart showing the process used when a member accesses the member access system.

A flowchart illustrating the process used when a member accesses the member access system 14 is illustrated in FIG. 6. The process of FIG. 6 starts at the step 220. At the step 222 it is determined if the user is registered as a member with the member access system 14. If the user is not yet registered as a member with the member access system 14, then the user is registered as a member at the step 224. At the step 226, the member is prompted to enter their full name. At the step 228, the member is prompted to enter any areas in which they are particularly interested. At the step 230, the member is prompted to enter their age. At the step 232, the member is prompted to enter the geographic area in which they are located. At the step 234, the member is prompted to enter their preferred method by which they would like to be contacted.

Once the user is registered as a member, it is then determined at the step 236, if the member would like to view the currently available bundles for purchase. If it is determined that the member would like to view the currently available bundles, then at the step 238, the member is presented with the bundles that are currently available. When viewing these currently available bundles the member also has the option of purchasing the bundles. If it is determined at the step 236 that the member does not want to view the currently available bundles, or once the member has completed viewing the currently available bundles at the step 238, the process then ends at the step 240.

A flowchart illustrating the member system notification process of the present invention is illustrated in FIG. 7. The bundle system of the preferred embodiment of the present invention allows a bundle vendor who is generating a bundle to notify members of the bundle system and obtain feedback and information from the members regarding the bundle. This allows the bundle vendor to make changes to the bundle to attempt to achieve more interest in the bundle from members when it is offered for purchase.

The process of FIG. 7 starts at the step 250. At the step 252 a list is generated of members to notify of the bundle. This list is based on multiple criteria including geographic location and interest areas. Once the list of members to notify is generated, then at the step 254, the preferred notification methods for the members on the list is determined. At the step 256, the members on the notification list are then notified according to their preferred notification method. The members on the notification list are also notified of the current status of the bundle at the step 258. At the step 260, it is then determined for each member on the notification list, if that member will purchase the bundle. Preferably, no commitment from the member to purchase the bundle is required at this time. Alternatively, a commitment to purchase the bundle is recorded from the member at this time. If it is determined that the member will not purchase the bundle, then the process is ended for that member at the step 276. For members for which it is determined, at the step 260, that they will purchase the bundle, then the information for those members that will purchase the bundle is consolidated at the step 262. This consolidated member information is then presented to the bundle participant vendors and the bundle vendor at the step 264. At the step 266, it is then determined based on the number of members willing to purchase the bundle, if the bundle should be changed. If it is determined that the bundle should be changed, then the process jumps to the bundle creation system process illustrated in FIGS. 5A and 5B and discussed above.

If it is determined at the step 266 that no changes need to be made to the bundle, then a final bundle profile is generated at the step 270. After the final bundle profile is generated at the step 270, the final bundle profile is posted to the member access system 14 to be viewed and purchased by members, at the step 272. The process then ends at the step 276.

Figure 8:
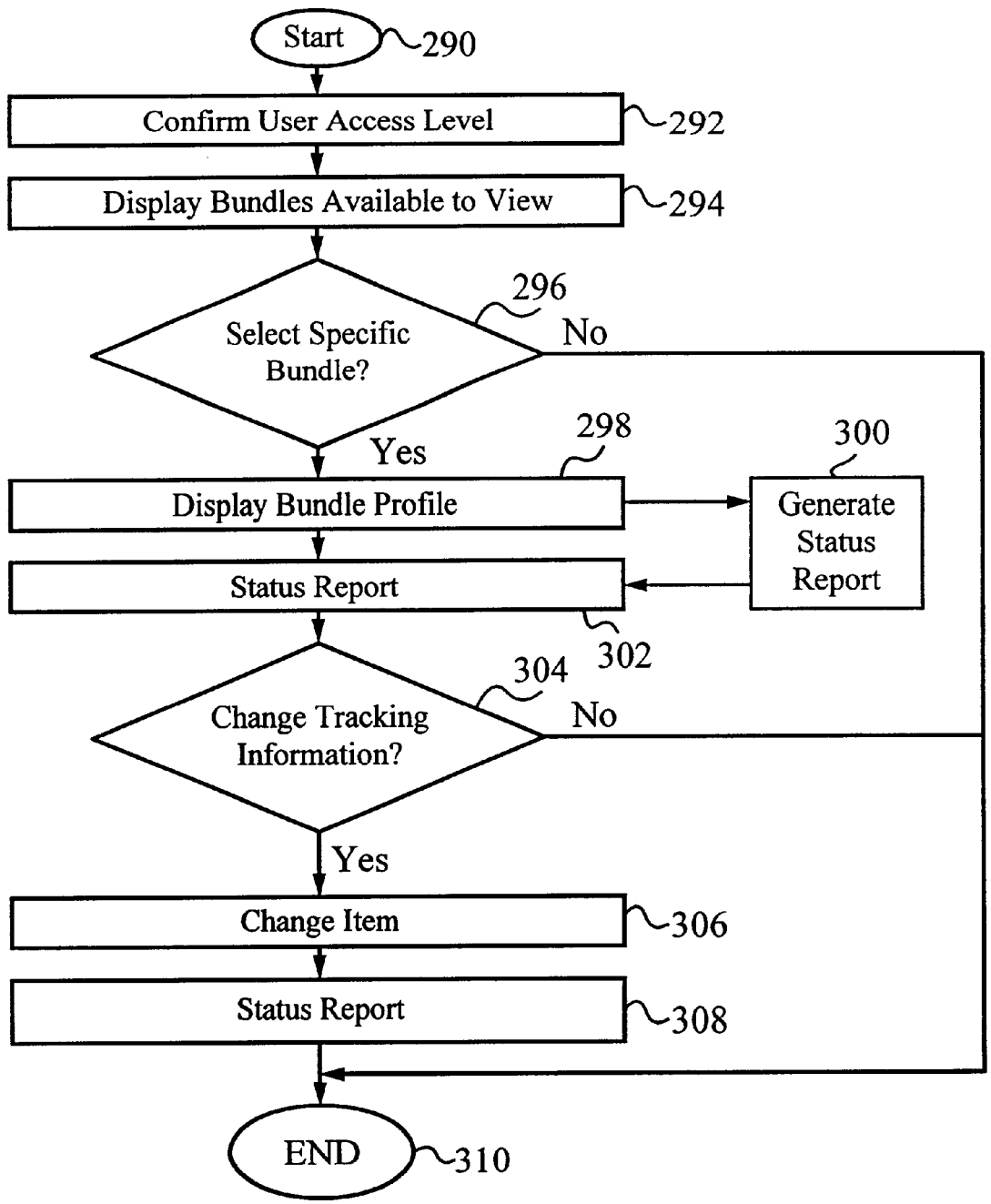
FIG. 8 illustrates a flowchart showing the bundle tracking system process of the present invention.

A flowchart illustrating the bundle tracking system process is illustrated in FIG. 8. As discussed above, the bundle tracking system is available to both members, through the member access system 14, and vendors, through the vendor access system 18. The process illustrated in FIG. 8 starts at the step 290. At the step 292, the appropriate access level for the current member or vendor is confirmed. The bundles currently available for viewing and purchasing are displayed at the step 294. At the step 296, it is determined for which specific bundle the user would like to view the tracking and status information. If it is determined that the user would not like to view tracking and status information for any currently available bundle, then the process is ended at the step 310.

If a specific bundle is selected at the step 296, then the bundle profile for that bundle is displayed at the step 298. At the step 300, a status report for the currently selected bundle is generated. A bundle can have a status of passive, active, created, selling or closed. A passive status indicates that the bundle has been created, but no further actions have yet been taken regarding the bundle. An active status indicates that the bundle is in the process of being generated and readied for the members to purchase. A created status indicates that the bundle is complete and ready to ship. A selling status indicates that the bundle is currently available for members to view and purchase. A closed status indicates that the bundle has been completely sold and all appropriate parties have been paid.

At the step 302, the status report for the currently selected bundle is displayed for the user. At the step 304, it is determined if the user has the authority to and would like to change the tracking information for the bundle they are currently viewing. If it is determined that the user does not want to change the tracking information for the bundle they are currently viewing, then the process is ended at the step 310. If it is determined, at the step 304, that the user does want to change the tracking information for the bundle they are currently viewing, then the appropriate information is changed at the step 306. At the step 308, the updated status report is displayed for the user. The type and form of status report displayed for the user will depend on the user's relationship to the bundle and their access level. The process is then ended at the step 310.

Figure 9:
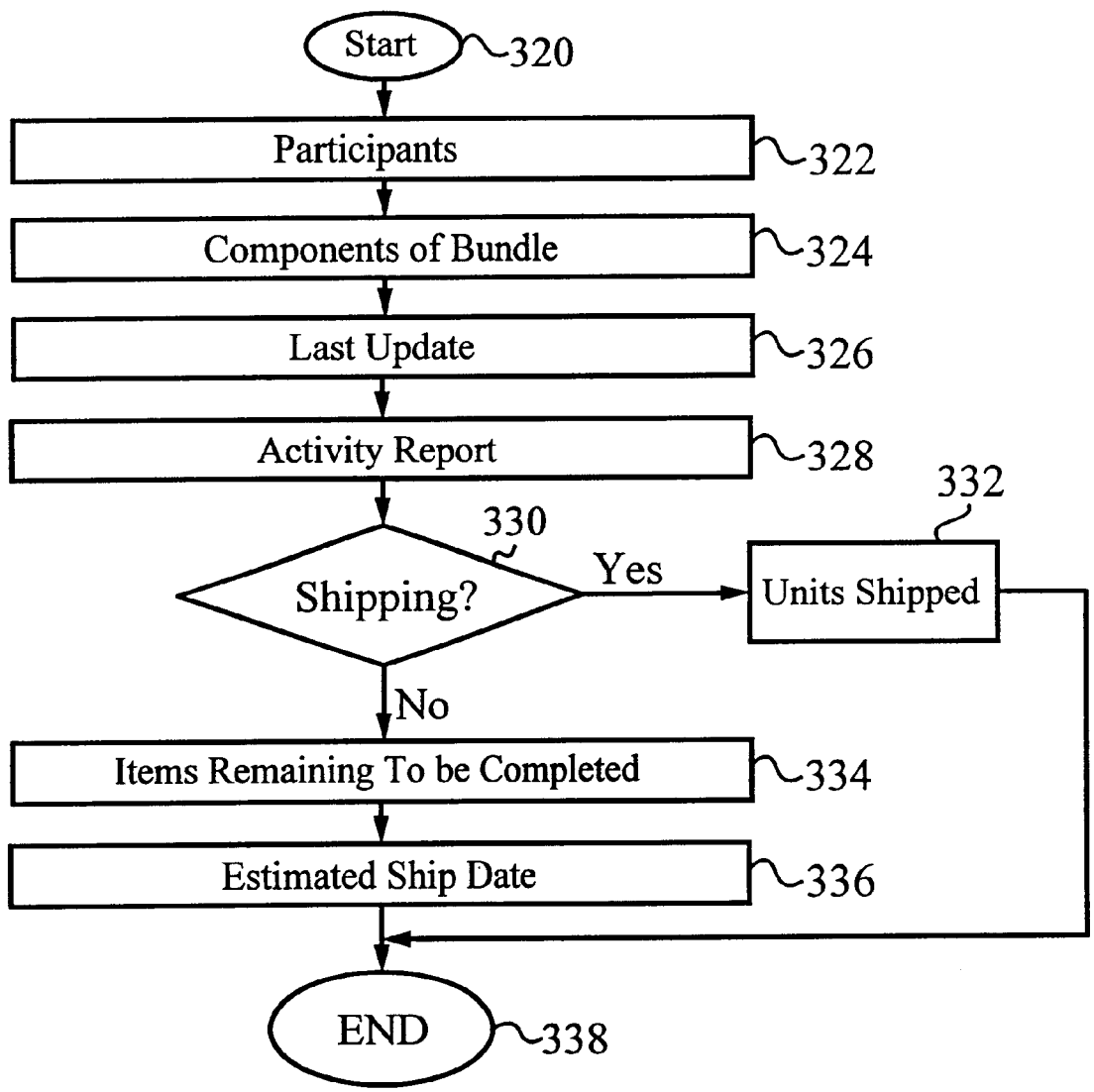
FIG. 9 illustrates a flowchart showing the process involved in generating a status report within the bundle system of the present invention.

A flowchart illustrating the process involved in generating the status report in step 300 of FIG. 8 is illustrated in FIG. 9. The process is started at the step 320. At the step 322, the participant vendors of the products/services within the bundle are determined. At the step 324, the components of the bundle are determined. At the step 326, the date of the generation of the last update of the status report is determined. At the step 328, the activity related to the bundle since the last update is determined. At the step 330, it is determined if the bundle is currently being shipped. If the bundle is currently being shipped, then the number of units shipped to date are determined at the step 332. If it is determined at the step 330, that the bundle is not currently being shipped, then the items remaining to be completed before the bundle is ready for shipping are determined at the step 334. The estimated ship date of the bundle is then determined at the step 336. After the number of units shipped is determined at the step 332 or after the estimated ship date of the bundle is determined at the step 336, the process ends at the step 338.

Once registered with the vendor access system 18, a vendor can post products/services, coupons, rebates and/or other incentives for inclusion in bundles with other products/services, coupons, rebates and/or other incentives by entering the product/service, coupon, rebate and/or other incentive into the product entry system, as described above. The product/service can be entered into the bundle system, both when the vendor is not willing to negotiate on the terms associated with the product/service, or, when the vendor is willing to negotiate the terms associated with the product/service with the bundle vendor. A bundle vendor is the vendor who generates the bundle. The bundle vendor can also be a participant vendor, who owns or provides one or more of the products/services within a bundle. However, the bundle vendor could also just be a marketer, member or consumer who does not own or provide any of the products/services within the bundle, but has an idea for a bundle of vendors' posted products/services that they believe would be attractive to members of the bundle system of the present invention.

To generate a bundle, the bundle vendor views the available products/services, coupons, rebates and/or other incentives, within the bundle system to determine the items to be included within the current bundle. Once the appropriate products/services are determined for the current bundle, the availability of the chosen products/services is determined with the participant vendors. Once all participant vendors approve the inclusion of their products/services within the current bundle, a bundle profile is generated and distributed to the participant vendors and the bundle vendor. As part of this process, the bundle vendor can choose to obtain feedback regarding the proposed bundle from the members. If the bundle vendor decides to obtain this member feedback, the bundle profile is distributed to certain members, based on selection criteria, to determine if those members would purchase this bundle. Once the bundle profile is approved by the participant vendors and the bundle vendor, a final bundle profile is generated. This final bundle profile is then posted as a bundle available for purchase on the member access system.

Once registered with the members access system, members can view and purchase the available bundles. A member purchases an available bundle, by selecting the bundle for purchase and entering in the member's payment information. Once the purchase is approved, the products/services within the bundle are then shipped or provided to the purchasing member. Depending on the bundle generated, the products/services can be shipped or provided together, or separately shipped and provided from each participant vendor. This is determined during generation of the bundle profile. When a bundle is purchased by a member, the number of bundles shipped is incremented in order to ensure that the number of bundles purchased will not exceed the number of available bundles. Once all of the available units within a bundle have been sold, the bundle is closed. Also, the bundle can be closed after a prescribed time period, if not all of the available units within the bundle are sold before the expiration of the prescribed time period. In an alternative embodiment of the present invention, bundles are also auctioned to members of the bundle system, as described above.

In the manner described herein, vendors are able to post available products/services, rebates, coupons and/or other incentives for inclusion in bundles which are advertised and sold to members. Bundle vendors are then able to automatically generate bundles from posted available items and advertise and sell those bundles to members through the member access system. Once a bundle is generated, the bundle is included within a bundle viewing system which is accessed by members through the members access system. In this bundle viewing system, a member can automatically select and purchase an available bundle of products and/or services. When a bundle is purchased by a member, the products/services within the bundle are then shipped or provided to the member either as a unit or separately from the participant vendors of the products/services included within the bundle. Using the bundle system of the present invention, vendors can post products/services for inclusion in bundles advertised and sold to members of the bundle system.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to those skilled in the art that while the preferred embodiment of the present invention is accessible over the internet through the public switched telephone network, the present invention could also be accessible on any other appropriate communication structures, including intranets, direct connections and the like.

I claim:

1. A method of generating a collection of items to be advertised and sold as a bundle comprising the steps of:
   a. posting available items available from item vendors for inclusion within the bundle for review by bundle vendors, wherein a listing of the available items and information about the available items is stored on and accessed through a bundle server;
   b. selecting by a bundle vendor one or more of the posted available items to be included within the bundle; and
   c. posting by the bundle vendor the bundle as available for purchase.

2. The method as claimed in claim 1 further comprising the step of accepting and processing orders of the bundle.

3. The method as claimed in claim 2 further comprising the step of providing the items within the bundle to a purchaser.

4. The method as claimed in claim 3 wherein the step of providing includes shipping items within the bundle together as a single unit.

5. The method as claimed in claim 3 wherein the step of providing includes shipping items within the bundle separately from each item vendor of the items within the bundle.

6. The method as claimed in claim 1 wherein the items include selective ones of products, goods, services, rebates and coupons.

7. The method as claimed in claim 1 wherein the step of posting available items is performed by the bundle server on which the information about the available items is stored.

8. The method as claimed in claim 7 further comprising the step of establishing an internet connection with the server to view and select the available items for inclusion within the bundle.

9. The method as claimed in claim 1 wherein the step of posting the bundle is performed by a server on which a bundle profile is stored.

10. The method as claimed in claim 9 further comprising the step of generating a bundle profile including information on the items included within the bundle.

11. The method as claimed in claim 9 further comprising the step of establishing an internet connection with the server to view the bundle profile of the bundle.

12. The method as claimed in claim 11 wherein the internet connection is established with a computer system at a remote location from the server.

13. The method as claimed in claim 1 further comprising the step of registering the vendors as a selective one or more of an item vendor having items for inclusion within the bundle and a bundle vendor taking responsibility for generating a bundle.

14. The method as claimed in claim 13 further comprising the step of negotiating terms of the bundle between the bundle vendor and the item vendors.

15. The method as claimed in claim 1 further comprising the step of obtaining feedback on the bundle from a selective group of users.

16. A bundle system for posting items to be included within a bundle and generating a collection of items to be advertised and sold within a bundle comprising:
   a. means for posting available items available from item vendors for inclusion within the bundle for review by bundle vendors;
   b. means for generating a bundle coupled to the means for posting for allowing a bundle vendor to select one or more available items to be included within the bundle; and
   c. means for posting the bundle coupled to the means for generating for posting the bundle by the bundle vendor as available for purchase.

17. The bundle system as claimed in claim 16 wherein the means for posting the bundle further accepts and processes orders for the bundle.

18. The bundle system as claimed in claim 17 wherein the means for posting available items is included within a server on which information about the available items is stored.

19. The bundle system as claimed in claim 18 wherein the means for posting the bundle is also included within the server on which a bundle profile is stored.

20. The bundle system as claimed in claim 19 wherein a connection is established between a computer system and the server to view and select the available items for inclusion within the bundle, to view the bundle profile of the bundle and to place an order to purchase the bundle.

21. The bundle system as claimed in claim 20 wherein the connection is established between the computer system and the server over the internet.

22. The bundle system as claimed in claim 21 wherein the bundle profile includes information on the items within the bundle.

23. The bundle system as claimed in claim 22 wherein the items include selective ones of products, goods and services.

24. A bundle system to post items to be included within a bundle and generating a collection of items to be advertised and sold within a bundle comprising:
   a. an interface circuit configured to establish a connection with a remote computer system; and
   b. a bundle server coupled to the interface circuit to allow item vendors to post available items for inclusion within the bundle for review by bundle vendors, to generate a bundle by allowing a bundle vendor to select one or more available items to be included within the bundle and to post the bundle by the bundle vendor as available to purchase.

25. The bundle system as claimed in claim 24 wherein the bundle server further accepts and processes orders of the bundle.

26. The bundle system as claimed in claim 24 wherein the connection is established with the remote computer system and the interface circuit over the internet to allow bundle vendors to view and select the available items for inclusion within the bundle and to allow users to view and purchase the bundle.

27. The bundle system as claimed in claim 26 wherein only users registered with the bundle server as members are allowed to view and purchase bundles.

28. The bundle system as claimed in claim 24 wherein the items include selective ones of products, goods and services.

29. The bundle system as claimed in claim 24 wherein the vendors are registered with the bundle server as a selective one or more of an item vendor having items for inclusion within the bundle and a bundle vendor taking responsibility for generating a bundle.

30. A network of devices for generating a collection of items to be advertised and sold as a unit comprising:
   a. one or more computer systems configured to communicate with other systems; and
   b. a bundle server configured to couple to the one or more computer systems to allow item vendors to post available items for inclusion within a bundle for review by bundle vendors, to generate a bundle by allowing a bundle vendor to select one or more available items to be included within the bundle and to post the bundle by the bundle vendor as available to purchase.

31. The network of devices as claimed in claim 30 wherein the bundle server further accepts and processes orders of the bundle.

32. The network of devices as claimed in claim 31 wherein the one or more computer systems and the bundle server are coupled together over the internet to allow bundle vendors to view and select the available items for inclusion within the bundle and to allow users to view and purchase the bundle.

33. The network of devices as claimed in claim 32 wherein the vendors are registered with the bundle server as a selective one or more of an item vendor having items for inclusion within the bundle and a bundle vendor taking responsibility for generating a bundle.

34. The network of devices as claimed in claim 33 wherein only users registered with the bundle server as members are allowed to view and purchase bundles.

35. The network of devices as claimed in claim 34 wherein the items include selective ones of products, goods and services.

* * * * *